United States Patent
Ohnishi et al.

[11] Patent Number: 6,094,150
[45] Date of Patent: Jul. 25, 2000

[54] SYSTEM AND METHOD OF MEASURING NOISE OF MOBILE BODY USING A PLURALITY MICROPHONES

[75] Inventors: Keizo Ohnishi; Kazufumi Ikeda, both of Takasago; Tetsuya Nagao, Komaki, all of Japan

[73] Assignee: Mitsubishi Heavy Industries, Ltd.

[21] Appl. No.: 09/129,945

[22] Filed: Aug. 6, 1998

[30] Foreign Application Priority Data

Sep. 10, 1997 [JP] Japan ..................... 9-245526

[51] Int. Cl.⁷ ................................. B60Q 5/00
[52] U.S. Cl. ..................... 340/943; 701/1; 701/301; 367/135; 367/127; 381/92
[58] Field of Search ............. 73/570, 645, 587; 340/943, 933, 935, 936; 701/1, 301, 117, 118, 119; 367/135, 127, 129; 381/92, 94.1

[56] References Cited

U.S. PATENT DOCUMENTS

| | | | |
|---|---|---|---|
| 4,509,149 | 4/1985 | Ruehle | 367/27 |
| 4,696,043 | 9/1987 | Iwahara et al. | 381/92 |
| 4,703,506 | 10/1987 | Sakamoto et al. | 381/92 |
| 5,473,701 | 12/1995 | Cezanne et al. | 381/92 |
| 5,798,983 | 8/1998 | Kuhn et al. | 367/135 |
| 5,878,367 | 3/1999 | Lee et al. | 701/117 |
| 6,021,364 | 2/2000 | Berliner et al. | 701/1 |

FOREIGN PATENT DOCUMENTS

| | | |
|---|---|---|
| 4324324 | 11/1992 | Japan . |
| 7111700 | 4/1995 | Japan . |
| 2235771 | 3/1991 | United Kingdom . |

*Primary Examiner*—Hezron Williams
*Assistant Examiner*—Rose M. Miller

[57] ABSTRACT

In a noise measuring system comprising a microphone array and a directivity forming section for controlling the direction of directivity of the microphone array, the directivity forming section includes delay section and adding section, and the optimal value of a delay time of the delay section is set in such a manner that a noise isolation characteristic for causing any mobile noise generator not targeted for noise measurement to come off a directional plane or a directional line formed in the direction of directivity of the microphone array and a deterioration characteristic of the directivity of the microphone array balance with each other.

3 Claims, 5 Drawing Sheets

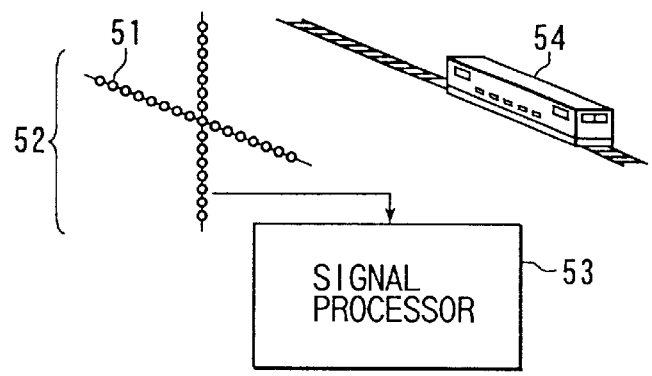
FIG. 1 PRIOR ART
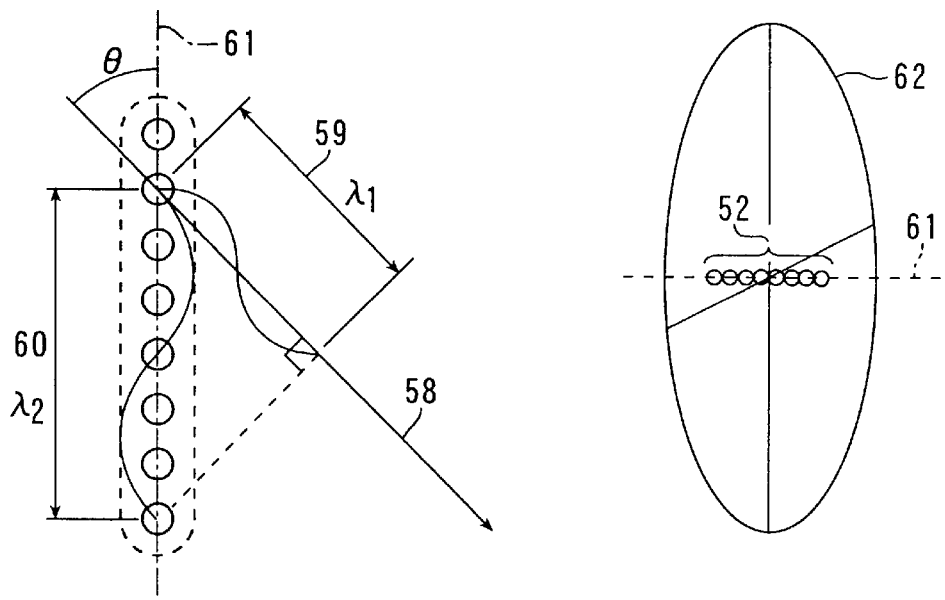
FIG. 2 PRIOR ART
FIG. 3 PRIOR ART
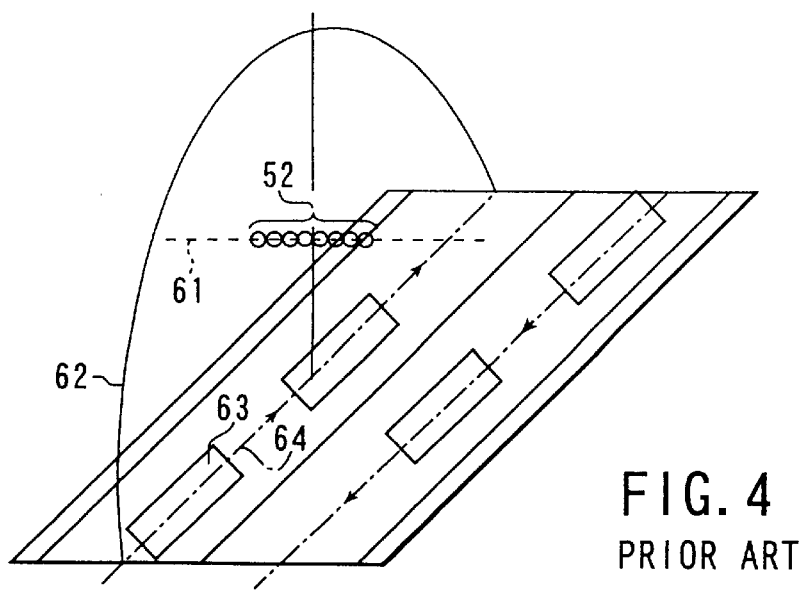
FIG. 4 PRIOR ART

SYSTEM AND METHOD OF MEASURING NOISE OF MOBILE BODY USING A PLURALITY MICROPHONES

BACKGROUND OF THE INVENTION

The present invention relates to a noise measuring system for measuring noise of a mobile noise generator, like a vehicle or a mobile body, by using a plurality of microphones, and, more particularly, to a noise measuring system and method which can isolate a plurality of mobile noise generators.

In the following description of a noise measuring system to which this invention is directed, terms are defined as follows. "Direction of directivity" is the direction in which one wants to collect sounds. "Axis of microphone array" or "microphone array axis" is the layout line of a plurality of microphone units arranged on the same line. "Apparent wavelength" is the wavelength of a spatial waveform when the spatial waveform can be detected along the microphone array from the spatial phase difference of the positions of the individual microphone units on the same line. "Layout angle" is either the angle that is defined by the surface of a road and the microphone array axis or the angle that is defined by the line of movement of a mobile noise generator and the microphone array axis.

A conventional noise measuring system will now be described with reference to FIGS. 1 through 4 using the above-defined terms. Directional arrayed microphones comprising a plurality of microphone units laid on the same line has been used to measure and isolate the noises of individual mobile bodies which move on a plurality of lines of movement.

To improve the directivity of directional arrayed microphones, the number of microphone units is increased by arranging two microphone arrays in a V shape or arranging microphone units in an arc as proposed in Jpn. Pat. Appln. KOKAI Publication No. 4-324324. FIG. 1 shows the structure of the conventional directional arrayed microphones disclosed in Jpn. Pat. Appln. KOKAI Publication No. 4-324324. Referring to FIG. 1, sounds of a mobile noise generator 54 are collected by a microphone array 52 comprising a plurality of microphone units 51. The outputs of the individual microphone units 51 of the microphone array 52 are sent to a signal processor 53.

The principle of the directional arrayed microphones will be discussed below. The directional arrayed microphones comprise a microphone array comprised of a plurality of microphone units arranged on the same line and a computer for processing data.

With f representing the frequency of sounds which are measured by the individual microphone units arranged in a line, if the frequency f is known, the wavelength $\lambda_1$ of a sound wave can be find out from the frequency f.

With the speed of sound being c, an equation (1) represents the relationship between the wavelength $\lambda_1$ of a sound wave and the frequency f.

$$\lambda_1 = c/f \tag{1}$$

Further, the spatial waveform can be detected along the microphone array from the spatial phase difference of the positions of the individual microphone units on the same line. The wavelength of that waveform is defined as an apparent wavelength $\lambda_2$. The angle of the approaching sound wave is acquired from the ratio of the wavelength $\lambda_1$ of the sound wave to the apparent wavelength $\lambda_2$ obtained on the microphone array.

An equation (2) shows how to acquire the angle of the approaching sound wave from the ratio of the wavelength $\lambda_1$ of the sound wave to the apparent wavelength $\lambda_2$ obtained on the microphone array.

$$\lambda_1/\lambda_2 = \cos\theta \tag{2}$$

FIG. 2 geometrically illustrates the principle of directional arrayed microphones. In FIG. 2, a numeral "58" indicates the direction of propagation of a sound wave, a numeral "59" indicates the wavelength $\lambda_1$ of the sound wave, a numeral "60" indicates the apparent wavelength $\lambda_2$ and a numeral "61" indicates the axis of the microphone array.

Collecting sounds at a specific ratio of the wavelength $\lambda_1$ of a sound wave to the apparent wavelength $\lambda_2$ according to this principle can allow sounds from a restricted direction to be output loud.

The direction of directivity (characteristic) of directional arrayed microphones is distributed symmetrical to the axis that is the microphone array, and forms a plane. This plane is defined as a directional plane.

Arrayed microphones whose directivity is formed by a delay time calculator will have the strongest directivity if the directivity is designed in such a way that the directional plane becomes a flat plane in a direction perpendicular to the microphone array.

FIG. 3 shows the directional plane of directional arrayed microphones available on the market, and a numeral "62" is the directional plane. FIG. 4 exemplarily shows measurement of noise of a mobile body by means of directional arrayed microphones available on the market. In FIG. 4, a numeral "64" denotes a line of movement.

The prior art has the following shortcomings. The directional plane of available directional arrayed microphones is a flat-like plane with the microphone array as a normal line. If a beam is put hanging above a road and the arrayed microphones are placed in such a manner that the microphone array is parallel to the road's surface and the projectional line of the microphone array on the road is perpendicular to vehicle lanes, therefore, a plurality of mobile noise generators which move on a target lane for measurement cannot be isolated.

If the arrayed microphones are placed in such a manner that the microphone array is parallel to the road's surface and the projectional line of the microphone array on the road is parallel to vehicle lanes, a plurality of mobile noise generators which move in parallel on lanes adjacent to a target lane for measurement cannot be isolated.

Further, the scheme of improving the precision of isolating mobile noise generators as disclosed in Jpn. Pat. Appln. KOKAI Publication No. 4-324324 increases the number of microphone units that constitute the microphone array.

Increasing the number of microphone units however complicates the overall system and thus undesirably results in an increased computation time and an increased cost.

Accordingly, it is an object of the present invention to provide a noise measuring system and method capable of improving the precision of isolating mobile noise generators without increasing the number of microphone units.

BRIEF SUMMARY OF THE INVENTION

This object is achieved by a noise measuring system comprising:

a microphone array placed on a predetermined microphone array axis and comprised of a plurality of microphone units for collecting sounds from mobile noise generators; and a directivity forming section for controlling a direction of directivity of the microphone array, the directivity forming section including delay means, connected to the plurality of microphone units, for delaying outputs of the plurality of microphone units and adding means for adding the outputs of the microphone units delayed by the delay means, an optimal value of a delay time of the delay means of the directivity forming section being set in such a manner that a noise isolation characteristic for causing any mobile noise generator not targeted for noise measurement to come off a directional plane or a directional line formed in the direction of directivity of the microphone array and a deterioration characteristic of a directivity of the microphone array balance with each other.

The above object is also achieved by a method of controlling a direction of directivity of a microphone array in a noise measuring system comprising the microphone array placed on a predetermined microphone array axis and comprised of a plurality of microphone units for collecting sounds from mobile noise generators, and a directivity forming section for controlling a direction of directivity of the microphone array, the directivity forming section including delay means, connected to the plurality of microphone units, for delaying outputs of the plurality of microphone units and adding means for adding the outputs of the microphone units delayed by the delay means, an optimal value of a delay time of the delay means being set in such a manner that a noise isolation characteristic for causing any mobile noise generator not targeted for noise measurement to come off a directional plane or a directional line formed in the direction of directivity of the microphone array and a deterioration characteristic of a directivity of the microphone array balance with each other.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out hereinbefore.

BRIEF DESCRIPTION OF THE SEVERAL VIEWS OF DRAWING

The accompanying drawings, which are incorporated in and constitute a part of the specification, illustrate a presently preferred embodiment of the invention and together with the general description given above and the detailed description of the preferred embodiment given below, serve to explain the principles of the invention.

FIG. 1 is a diagram showing the structure of conventional directional arrayed microphones;

FIG. 2 is a diagram geometrically illustrating the principle of directional arrayed microphones;

FIG. 3 is a diagram showing the directional plane of directional arrayed microphones available on the market;

FIG. 4 is a diagram exemplarily showing measurement of noise of a mobile body by means of directional arrayed microphones available on the market;

DETAILED DESCRIPTION OF THE INVENTION

First Embodiment

Figure 5:
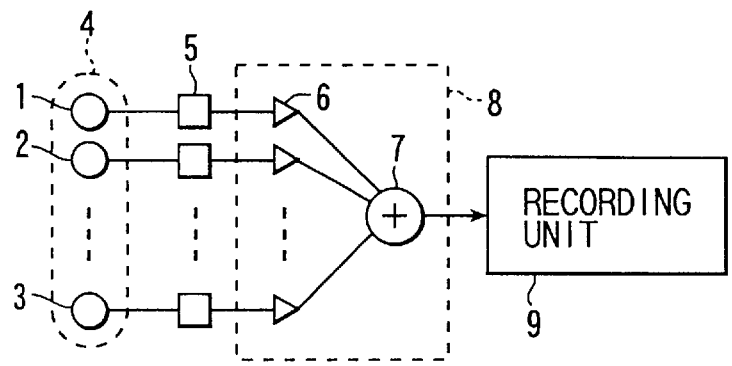
FIG. 5 is a diagram depicting the structure of an apparatus embodying the invention.
Figures 6, 7:
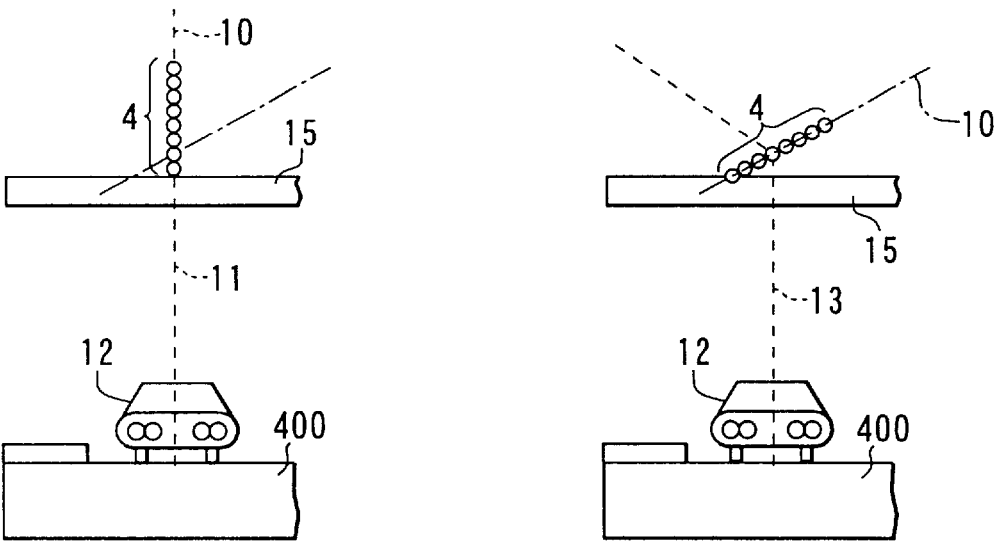
FIG. 6 is a diagram (1) illustrating a mobile-body noise measuring method according to a first embodiment.
FIG. 7 is a diagram (2) illustrating a mobile-body noise measuring method according to the first embodiment.
Figure 8:
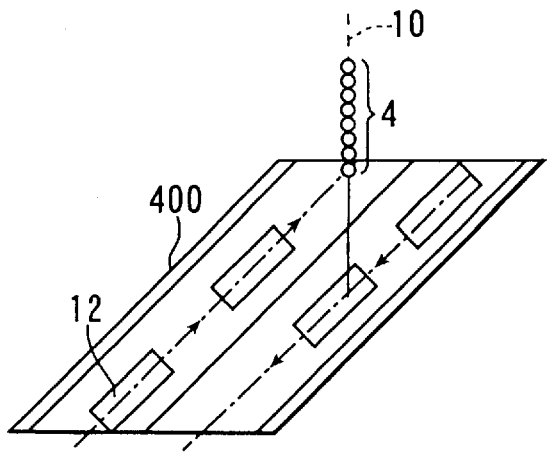
FIG. 8 is a diagram (1) showing the operation of the mobile-body noise measuring method according to the first embodiment.
Figure 9:
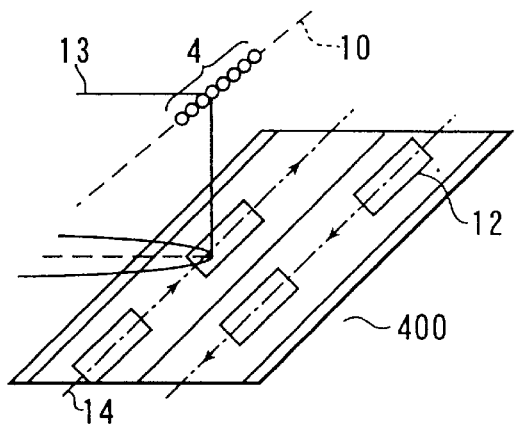
FIG. 9 is a diagram (2) showing the operation of the mobile-body noise measuring method according to the first embodiment.

A first embodiment of the present invention will now be described with reference to FIGS. 5 through 7. This embodiment comprises a single microphone array 4 comprised of a plurality of microphone units placed on the same line, amplifiers 5 for amplifying the outputs of the individual microphone units of the microphone array 4, a directivity forming unit 8 for forming the direction of directivity in a direction other than a direction perpendicular to the microphone array 4, and a recording unit 9 for recording the measuring results.

The directivity forming unit 8 can form the direction of directivity in a direction other than a direction perpendicular to the microphone array 4. The directivity forming unit 8 includes delay time calculators 6 equal in number to the microphone units that constitute the microphone array 4, and an adder unit 7 for adding the computation results from the delay time calculators 6.

For the sake of simplicity, the structure of this embodiment will now be described specifically with reference to a case where the embodiment has a single microphone array. Of course, the invention may use a plurality of microphone arrays. Referring to FIG. 1, the microphone array 4 comprises N microphone units. Specifically, the microphone array 4 includes a first microphone unit 1, a second microphone unit 2, and so forth, and an N-th microphone unit 3. The outputs of those microphone units are amplified by the amplifiers 5 respectively connected to the microphone units, and the amplified outputs are sent to the directivity forming unit 8. The directivity forming unit 8 includes the delay time calculators 6 equal in number to those microphone units, and the single adder unit 7, and controls the directivity of the microphone array 4 with the set delay times of the delay time calculators 6.

The outputs of the microphone units amplified by the respective amplifiers 5 are delayed by the delay time calculators 6 in the directivity forming unit 8. The outputs of the microphone units delayed by the respective delay time calculators 6 are added together by the adder unit 7, and the result is sent to the recording unit 9.

According to one control mode of this embodiment, the directivity of the directivity forming unit 8 is controlled in such a way that the direction of directivity coincides with the axis of the microphone array, thereby controlling the laid position and angle of the microphone array and the directivity so that the directional line intersects the line of movement of a mobile noise generator.

According to another control mode, the directional plane is so designed as to be a conical plane with the microphone array being its axis, and the laid position and angle of the microphone array and the directivity are controlled in such a way that the line intersecting the conical plane and the road surface targeted for measurement becomes a parabola or an ellipse or a hyperbola.

In FIGS. 6 to 9, a mobile noise generator 12 like a vehicle is moving along a line of movement on a road surface 400. Hanging above the road surface 400 is a beam 15 on which a microphone array 4 is placed on an array axis 10. A numeral "11" indicates the line of directivity and a numeral "13" a directional conical plane.

According to the conventional method, a plurality of noise generators are present within a directional plane and the arrayed microphones is not directional to those noise generators, disabling accurate measurement of a noise generator targeted for measurement. (hereinafter called "target noise generator").

The present system, by way of contrast, can catch just a target noise generator in a directional plane or a directional line, and can thus improve the measuring precision without increasing the number of microphone units.

Designing the direction of directivity oblique to the axis of the microphone array or along the array axis as in this invention can allow only a target noise generator to be caught in a directional plane or a directional line and can thus improve the measuring precision.

In general, the directivity of arrayed microphones becomes strongest when the direction of directivity is directed perpendicular to the microphone array, becomes weaker as the angle defined by the direction of directivity and the microphone array gets acuter, and becomes weakest when the direction of directivity is directed to the axial direction of the microphone array.

Figure 10:
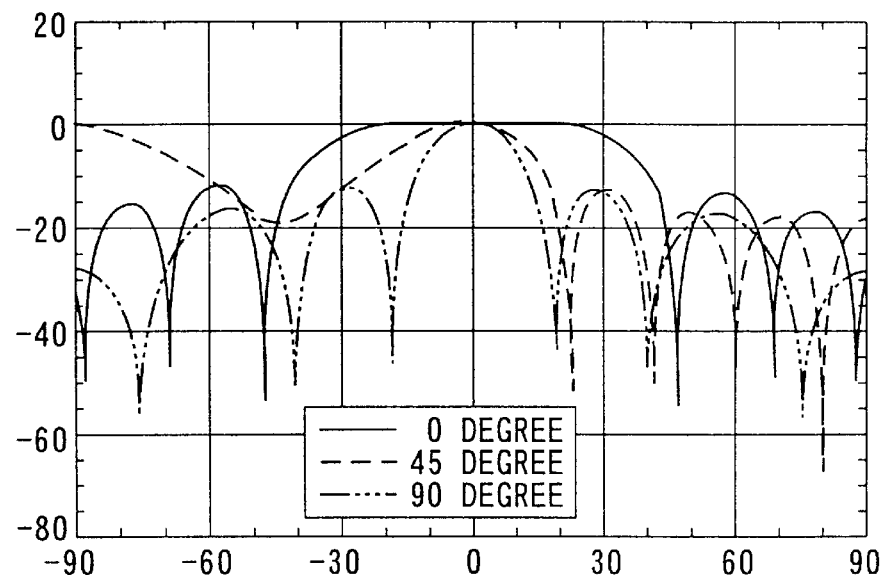
FIG. 10 is a diagram depicting the results of an experiment on the relationship between the direction of directivity and the strength of the directivity according to the first embodiment.

FIG. 10 is a diagram showing the results of an experiment on the relationship between the direction of directivity (angle) and the strength of the directivity according to the first embodiment. The origin on the horizontal axis means each direction of directivity. FIG. 10 shows the directivities when the angle between the direction of directivity and the microphone array axis is 0 degree, 45 degrees and 90 degrees.

Figure 11:
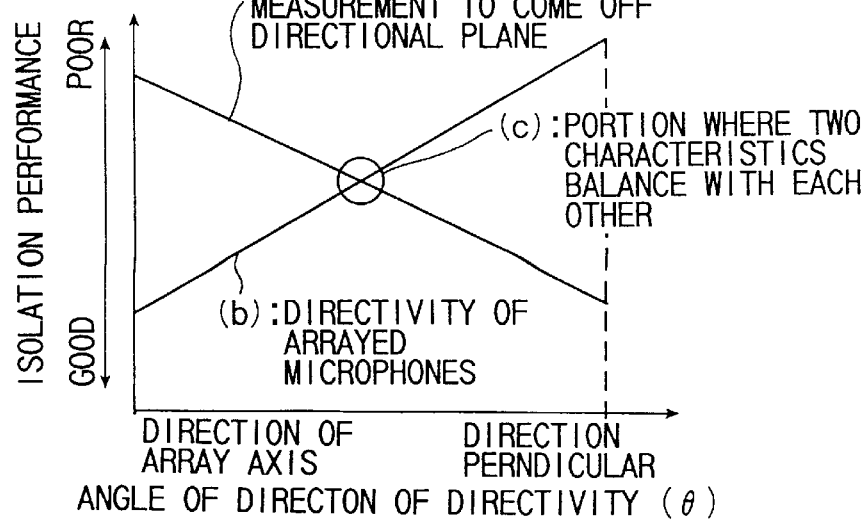
FIG. 11 is a diagram illustrating how to acquire a point of balance between a characteristic (a) for improving a noise isolation performance according to the first embodiment, and a deterioration characteristic (b) of the directivity of arrayed microphones.

FIG. 11 is a diagram illustrating how to acquire a point of balance between a characteristic (a) for improving a noise isolation performance according to the first embodiment by making the angle θ between the direction of directivity and the microphone array axis in the first embodiment acuter, and a deterioration characteristic (b) of the directivity of arrayed microphones by making the angle θ between the direction of directivity and the microphone array axis acuter.

It is apparent from FIGS. 10 and 11 that setting the direction of directivity oblique to the axis of the microphone array or along the array axis can allow only a target noise generator to be caught in a directional plane or a directional line, thus ensuring an improved measuring precision.

Further, measurement with the highest accuracy can be achieved by providing the directivity in such a direction that the characteristic (a) for improving a noise isolation performance by setting the direction of directivity oblique to the axis of the microphone array or along the array axis is balanced with the deterioration characteristic (b) of the directivity of arrayed microphones by making the angle θ between the direction of directivity and the microphone array axis acuter.

Second Embodiment

Figure 12A:
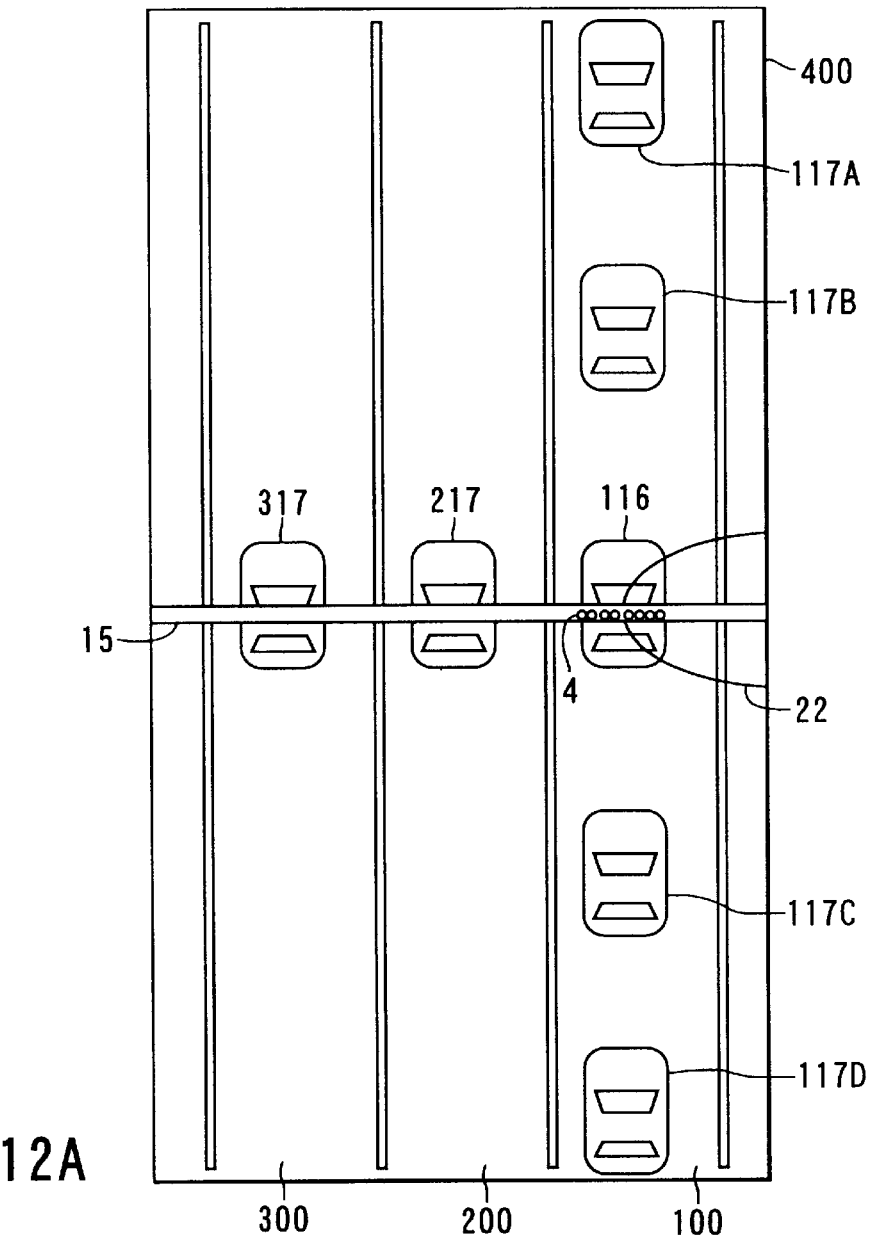
FIGS. 12A and 12B are a plan view and a cross-sectional view illustrating a mobile-body noise measuring method according to a second embodiment.
Figure 12B:
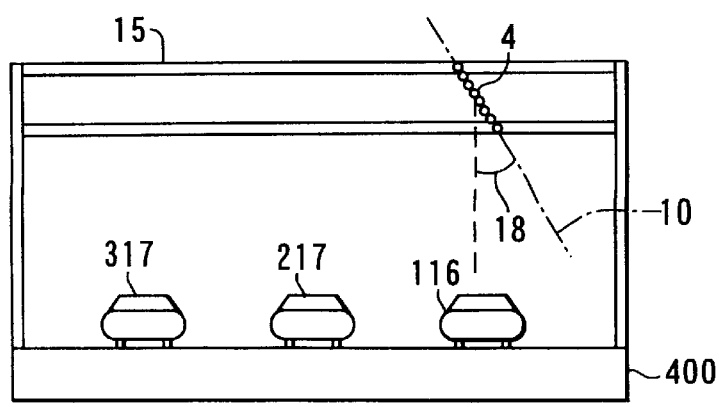

Let us consider, as a second embodiment, specific measurement of noises generated particularly by vehicles as noise generators which move on a road with a plurality of lanes. The second embodiment is illustrated in FIGS. 5, 12A and 12B. This embodiment can use basically the same electric components as shown in FIG. 5, like the microphone array 4, the amplifiers 5 and the directivity forming unit 8.

Figure 13:
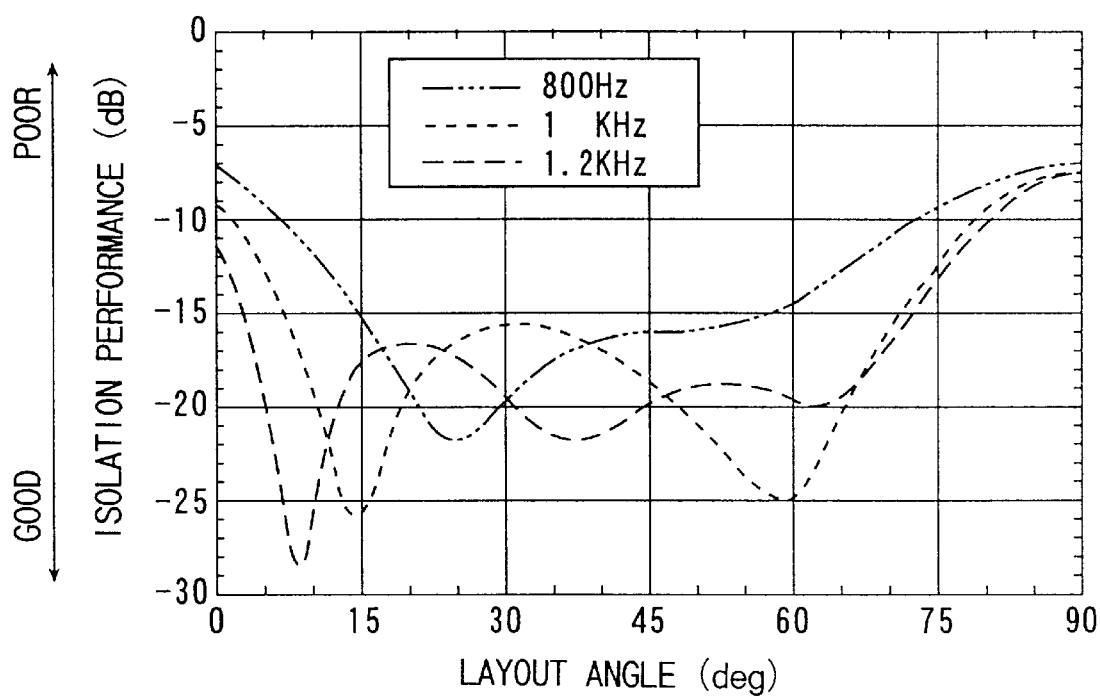
FIG. 13 is a diagram depicting the results of a numerical experiment on the relationship among the direction of directivity, the layout angle and the performance according to the second embodiment.

FIG. 12A is a diagram as viewed from above the road surface 400 and FIG. 12B is a cross-sectional view of the road surface 400. FIG. 13 is a diagram showing the results of a numerical experiment on the relationship among the direction of directivity, the layout angle and the performance according to the second embodiment.

Referring to FIGS. 12A and 12B, the microphone array 4 is placed on the beam 15. A noise-measurement target vehicle 116 is running on the road surface 400; numerals "117," "217" and "317" are non-target vehicles. A numeral "18" is the inclination angle of the microphone array 4, numerals "100," "200" and "300" respectively indicate the first, second and third lanes, and a numeral "22" is the line of intersection between a directional conical plane and the road surface 400. The road surface 400 is the surface of a straight 3-lane road. The distance between vehicles on the road is 10 m, and the distance to the center line of each lane is 3.5 m. The lane where the target vehicle runs is the first lane above which the microphone array 4 is placed on the beam 15. The height of the beam 15 from the road surface is 5.5 m. Directly below the microphone array 4 located on the beam 15 is a noise-measuring target position.

Under the aforementioned layout conditions, the inclination angle of the microphone array 4 is 0 degree when the microphone units constituting the microphone array 4 are aligned vertically, and the direction of directivity has an angle of 0 degree when the direction of directivity of the arrayed microphones is the direction of the array axis.

Making the inclination angle of the microphone array 4 coincide with the angle of the direction of directivity can allow the position directly below the microphone array 4 to lie within the directional plane or the directional line.

It is assumed that non-target vehicles (217, 317) as noise generators are on the second and third lanes and run parallel to the target vehicle, and that the two non-target vehicles (117A, 117B, 117C, 117D) as noise generators are positioned on the same line as the target vehicle, two in front of the target vehicle and too at the back.

It is apparent from FIG. 13 that measurement should be performed with the arrayed microphones laid out in such a way that the direction of directivity ranges from the direction of the array axis to 15 to 60 degrees and the inclination angle of the microphone array set equal to the angle of the direction of directivity in a range of 800 Hz to 1.2 kHz of the frequency of sounds to be collected.

The three lines in FIG. 13 respectively show the average values $N_{11}$ of the sound pressure in the case of the frequency of 800 Hz, the frequency of 1.0 kHz and the frequency of 1.2 kHz. It is to be noted that eight microphone units constitute the microphone array which has a length of 1 m.

FIG. 13 shows the results of a numerical experiment on the relationship between the average value $N_1$ of $N_{12}$ and $N_{13}$ and the direction of directivity in this invention or the inclination angle of the microphone array, where $N_{12}$ is a difference between the sound pressure level of the noise of the target vehicle 116 on the first lane, which is to be measured by the present apparatus, and the sound pressure level of the noise of each of the non-target vehicles 217 and 317 which run parallel on the second and third lanes, and $N_{13}$ is a difference between the sound pressure level of the noise of the target vehicle 116 on the first lane and the sound pressure level of the noise of each of the non-target vehicles (117A–117D) which run parallel on the same lane (first lane).

As this invention has the above-described structure, the invention has the following advantages. While a plurality of noise generators are present within a directional plane and the arrayed microphones is not directional to those noise generators according to the conventional method, thus disabling accurate measurement of a target noise generator, the present apparatus can catch only a target noise generator in a directional plane or a directional line and can thus improve the measuring precision without increasing the number of microphone units.

Further, setting the direction of directivity oblique to the axis of the microphone array or along the array axis can allow only a target noise generator to be caught in a directional plane or a directional line. This can improve the measuring accuracy.

Furthermore, measurement with the highest accuracy can be achieved by providing the directivity in such a direction that the characteristic for improving the noise isolation performance by setting the direction of directivity oblique to the axis of the microphone array or along the array axis is balanced with the deterioration characteristic of the directivity of arrayed microphones by making the angle θ between the direction of directivity and the microphone array axis acuter.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A noise measuring system comprising:

a microphone array placed on a predetermined microphone array axis and comprised of a plurality of microphone units for collecting sounds from mobile noise generators; and a directivity forming section for controlling a direction of directivity of said microphone array, said directivity forming section including delay means, connected to said plurality of microphone units, for delaying outputs of said plurality of microphone units and adding means for adding said outputs of said microphone units delayed by said delay means, an optimal value of a delay time of said delay means of said directivity forming section being set in such a manner that a noise isolation characteristic and a deterioration characteristic of a directivity of said microphone array balance with each other, said noise isolation characteristic causing any mobile noise generator not targeted for noise measurement to come off a directional plane or a directional line formed in said direction of directivity of said microphone array.

2. The system according to claim 1, wherein said directivity forming section further includes means for controlling said direction of directivity of said microphone array in such a way that said direction of directivity of said microphone array is oblique to said microphone array axis or extends along said microphone array axis.

3. A method of controlling a direction of directivity of a microphone array in a noise measuring system comprising said microphone array placed on a predetermined array axis and comprised of a plurality of microphone units for collecting sounds from mobile noise generators, and a directivity forming section for controlling a direction of directivity of said microphone array, said directivity forming section including delay means, connected to said plurality of microphone units, for delaying outputs of said plurality of microphone units and adding means for adding said outputs of said microphone units delayed by said delay means, comprising:

setting an optimal value of a delay time of said delay means in such a manner that a noise isolation characteristic and a deterioration characteristic of a directivity of said microphone array balance with each other, said noise isolation characteristic causing any mobile noise generator not targeted for noise measurement to come off a directional plane or a directional line formed in said direction of directivity of said microphone array.

* * * * *